US009854541B2

(12) United States Patent
Lee (10) Patent No.: US 9,854,541 B2
(45) Date of Patent: Dec. 26, 2017

(54) COMMUNICATION DEVICE AND METHOD FOR CONTROLLING POWER THEREOF

(71) Applicant: SOLiD, INC., Seongnam-si, Gyeonggi-do (KR)

(72) Inventor: Hwan Sun Lee, Bucheon-si (KR)

(73) Assignee: SOLiD, INC., Seongnam-si (KR)

( * ) Notice: Subject to any disclaimer, the term of this patent is extended or adjusted under 35 U.S.C. 154(b) by 0 days.

(21) Appl. No.: 14/938,086

(22) Filed: Nov. 11, 2015

(65) Prior Publication Data
US 2016/0295527 A1 Oct. 6, 2016

Related U.S. Application Data

(63) Continuation of application No. PCT/KR2015/003623, filed on Apr. 10, 2015.

(30) Foreign Application Priority Data

Mar. 31, 2015 (KR) .......................... 10-2015-0044716

(51) Int. Cl.
*H04W 52/02* (2009.01)
*H04W 52/34* (2009.01)
(Continued)

(52) U.S. Cl.
CPC ....... *H04W 52/34* (2013.01); *H04W 52/0209* (2013.01); *H04W 52/52* (2013.01);
(Continued)

(58) Field of Classification Search
CPC .... H04B 7/145–7/17; H04W 52/0209; H04W 52/34; H04W 52/52; H04W 72/0406; H04W 72/0473; Y02B 60/50
(Continued)

(56) References Cited

U.S. PATENT DOCUMENTS 5,831,477 A * 11/1998 Tsumura .............. H03G 1/0088
330/133
6,356,745 B1 * 3/2002 Lee ..................... H04W 52/367
330/129
(Continued)

FOREIGN PATENT DOCUMENTS

KR   10-2007-0052126 A   5/2007
KR   10-2011-0050915     5/2011
KR      10-1256844 B1    5/2013

OTHER PUBLICATIONS

International Search Report issued in PCT/KR2015/003623 dated Apr. 10, 2015.
Written Opinion issued in PCT/KR2015/003623 dated Jan. 27, 2016.

*Primary Examiner* — Raymond Dean
(74) *Attorney, Agent, or Firm* — Sughrue Mion, PLLC (57) ABSTRACT

A communication device for power saving and a method for controlling power thereof are provided. The communication device includes a power amplifying unit and a control unit. The power amplifying unit generates an output signal obtained by amplifying a downlink signal, using a supply voltage, and outputs the output signal. The control unit determines a current state by comparing predetermined downlink reference information with output signal information on the output signal, and, if the current state is an active state as a comparison result, controls the supply voltage to correspond to the output signal information. Accordingly, power for amplifying a signal can be controlled according to communication traffic, thereby preventing consumption of unnecessary power.

11 Claims, 6 Drawing Sheets

(51) Int. Cl.
*H04W 72/04* (2009.01)
*H04W 52/52* (2009.01)

(52) U.S. Cl.
CPC ... *H04W 72/0406* (2013.01); *H04W 72/0473* (2013.01); *Y02B 60/50* (2013.01)

(58) Field of Classification Search
USPC ......... 455/7–11.1, 14–25, 522; 370/315, 318
See application file for complete search history.

(56) References Cited

U.S. PATENT DOCUMENTS

| | | | |
|---|---|---|---|
| 2004/0266339 A1* | 12/2004 | Larsson | H04B 7/022 455/7 |
| 2011/0078477 A1* | 3/2011 | Park | G06F 1/3203 713/322 |
| 2015/0039922 A1* | 2/2015 | Chalhoub | G06F 1/3234 713/323 |

\* cited by examiner

COMMUNICATION DEVICE AND METHOD FOR CONTROLLING POWER THEREOF

CROSS REFERENCE TO RELATED APPLICATIONS

This application is a continuation application of International Application No. PCT/KR2015/003623, filed Apr. 10, 2015, and claims priority from Korean Patent Application No. 10-2015-0044716 filed Mar. 31, 2015, the contents of which are incorporated herein by reference in their entireties.

BACKGROUND

1. Field

The inventive concept relates to a communication device and a method for controlling power thereof, and more particularly, to a communication device which is capable of efficiently decreasing power consumption, and a method for controlling power thereof.

2. Description of Related Art

With the development of information and communication technologies, changes in living patterns, and high economic growth, the pattern of communication culture is rapidly changed. In a technetronic society, a mobile communication terminal capable of receiving a wireless communication service anytime and anywhere according to needs for information transfer at high speed becomes one of important communication devices indispensable to daily life.

Unlike wide area systems using a communication service area as one wide area, most communication systems for communication services of mobile communication terminals provide communication services by dividing a service area into small areas called "cells." A communication device, such as a repeater, which provides smooth communication services between base stations and mobile communication terminals, is installed in a radio wave shadow area, such as a basement, an interior of a building or a tunnel, which radio waves are difficult to reach. The communication device receives and amplifies a low-power signal transmitted from a base station and then transmits the signal to a mobile communication terminal or another communication device in a radio wave shadow area. Also, the communication device amplifies and filters a signal of the mobile communication terminal located in the radio wave shadow area so that the signal can reach the base station, and transmits the signal to the base station.

The communication device receives power supplied from a power supply unit (PSU) for the purpose of its stable operation, and amplifies and outputs a received signal by using the supplied power. In this instance, the communication device always amplifies the received signal by using constant power regardless of the magnitude of the signal. Hence, when the magnitude of the received signal is small, the communication device consumes relatively excessive power.

SUMMARY

According to an aspect of the inventive concept, there is provided a communication device, comprising: a power amplifying unit configured to generate an output signal obtained by amplifying a downlink signal, using a supply voltage, and output the output signal; and a control unit configured to determine a current state by comparing predetermined downlink reference information with output signal information on the output signal, and, if the current state is an active state as a comparison result, control the supply voltage to correspond to the output signal information.

The communication device may further comprise a storage unit configured to store voltage control information. The control unit may read control information corresponding to the output signal information by using the voltage control information in the active state, and control the supply voltage by using the control information.

If it is determined that the current state is an idle state, the control unit may control the supply voltage to correspond to a first voltage.

If it is determined that the current state has been released from the idle state, the control unit may control the supply voltage to correspond to the output signal information.

The communication device may further comprise a storage unit configured to store predetermined first idle time information. If the current state is the idle state and a current time corresponds to the first idle time information, the control unit may control the supply voltage to correspond to a second voltage, and the second voltage is a voltage lower than the first voltage.

If the idle state is released at a time corresponding to the first idle time information, the control unit may delete the first idle time information.

The communication device may further comprise a storage unit configured to store second idle time information. The control unit may generate the second idle time information corresponding to a time when the current state is determined as the idle state.

If the time when the current state is determined as the idle state is repeated m times, the control unit may generate the second idle time information. The m is a natural number of 2 or more.

The output signal information may correspond to any one of an average value and a root mean square with respect to power of the output signal.

The power amplifying unit may comprise a plurality of power amplifiers configured to perform different communication services, and the control unit may control the supply voltage input to each of the plurality of power amplifiers.

The control unit may compare predetermined uplink reference information with uplink signal information on an uplink signal, and determine the current state by comparing the downlink reference information with the output signal information.

According to other aspect of the inventive concept, there is provided a method for controlling power of a communication device, the method comprising: comparing predetermined downlink reference information with output signal information on an output signal obtained by amplifying a downlink signal using a supply voltage; determining a current state of the communication device based on a comparison result; and if it is determined that the current state is an active state, controlling the supply voltage to correspond to the output signal information.

The controlling of the supply voltage may comprise, reading control information corresponding to the output signal information by using predetermined voltage control information in the active state; and controlling the supply voltage by using the control information.

The method may further comprise, if it is determined that the current state is an idle state, controlling the supply power to correspond to a first voltage.

The method may further comprise, if it is determined that the current state has been released from the idle state, controlling the supply voltage to correspond to the output signal information.

The controlling of the supply voltage to correspond to the first voltage may comprise, if the current state is the idle state, determining whether a current time corresponds to predetermined first idle time information; and if the current time does not correspond to the first idle time information, controlling the supply voltage to correspond to the first voltage.

The controlling of the supply voltage to correspond to the first voltage may further comprise, if the current time corresponds to the first idle time information, controlling the supply voltage to correspond to a second voltage. The second voltage may be a voltage lower than the first voltage.

The method may further comprise, if the idle state is released at a time corresponding to the first idle time information, deleting the first idle time information.

The method may further comprise, generating and storing second idle time information corresponding to a time when the current state is determined as the idle state.

The generating and storing of the second idle time information may comprise, if the time when the current state is determined as the idle state is repeated m times, generating and storing the second idle time information. The m may be a natural number of 2 or more.

BRIEF DESCRIPTION OF THE FIGURES

The above and other features of the inventive concept will now be described in detail with reference to certain exemplary embodiments thereof illustrated the accompanying drawings which are given hereinbelow by way of illustration only, and thus are not limitative of the inventive concept, and wherein.

DETAILED DESCRIPTION OF THE EXEMPLARY EMBODIMENTS

Exemplary embodiments of the inventive concept will be described below in more detail with reference to the accompanying drawings. The inventive concept may, however, be embodied in different forms and should not be construed as limited to the embodiments set forth herein.

Rather, these embodiments are provided so that this disclosure will be thorough and complete, and will fully convey the scope of the inventive concept to those skilled in the art. Throughout the disclosure, like reference numerals refer to like parts throughout the various figures and embodiments of the inventive concept.

When referring to "connected" or "coupled" for one component to another, though it is possible for one component to be connected or coupled directly to another, it is also understood that there may be a third component therebetween. However, when referring to "directly connected" or "directly coupled" for one component to another, it is understood that there is no other component therebetween.

Figure 1:
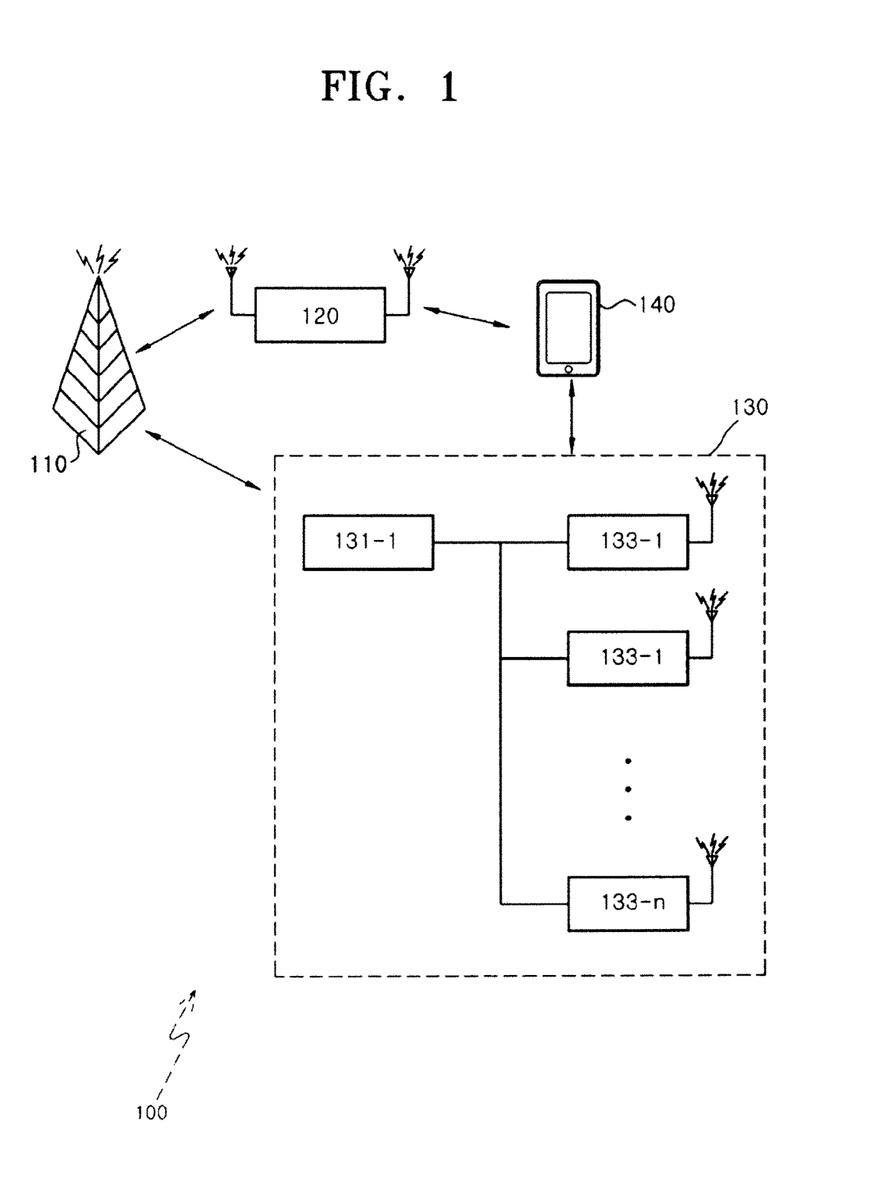
FIG. 1 is a configuration diagram of a mobile communication system according to an embodiment of the inventive concept.

FIG. 1 is a configuration diagram of a mobile communication system according to an embodiment of the inventive concept.

Referring to FIG. 1, the mobile communication system 100 according to the embodiment of the inventive concept includes a base station 110, a first communication device 120, a second communication device 130 and a mobile communication terminal 140. Here, the first communication device 120 is exemplified as a repeater. The second communication device 130 is exemplified as at least one node unit of distributed antenna system (DAS). Thus, the second communication device 130 may be a master unit 131-1 connected by wire to a base station, and/or at least one of n remote units 133-1, 133-2, . . . , 133-n (hereinafter, commonly designated as 133-n) connected by wire to the master unit 131-1.

Here, the base station 110 is a wireless communication device for connecting terminals to a network in order to provide wireless communication services. The base station 110 connects terminals to an access network such as long term evolution (LTE), code division multiple access (CDMA), wireless broadband Internet (WiBro), wideband code division multiple access (WCDMA), or global system for mobile communications (GSM). In addition, the base station 110 communicates with the mobile communication terminal 140 or the first or second communication device 120 or 130 through communication such as wired local loop (WLL), wireless LAN (Wi-Fi), world interoperability for microwave access (WiMAX), or wide area networks (WAN). That is, the base station 110 connects the mobile communication terminal 140 to a mobile communication network in order to provide mobile communication services.

In a case where it is difficult to perform smooth signal transmission due to a long distance between the base station 110 and the mobile communication terminal 140, the first or second communication device 120 or 130 may function to amplify signals between the base station 110 and the mobile communication terminal 140. In this instance, the first or second communication device 120 or 130 according to the embodiment of the inventive concept may monitor a signal input from the base station 110 and/or another communication device (not shown) (hereinafter, referred to as a 'downlink signal') in order to prevent consumption of unnecessary power. Also, the first or second communication device 120 or 130 according to the embodiment of the inventive concept may control power for amplifying the downlink signal, corresponding to a monitoring result. Hereinafter, an operation of the first or second communication device 120 or 130 according to the embodiment of the inventive concept will be described in detail with reference to FIG. 2.

Figure 2:
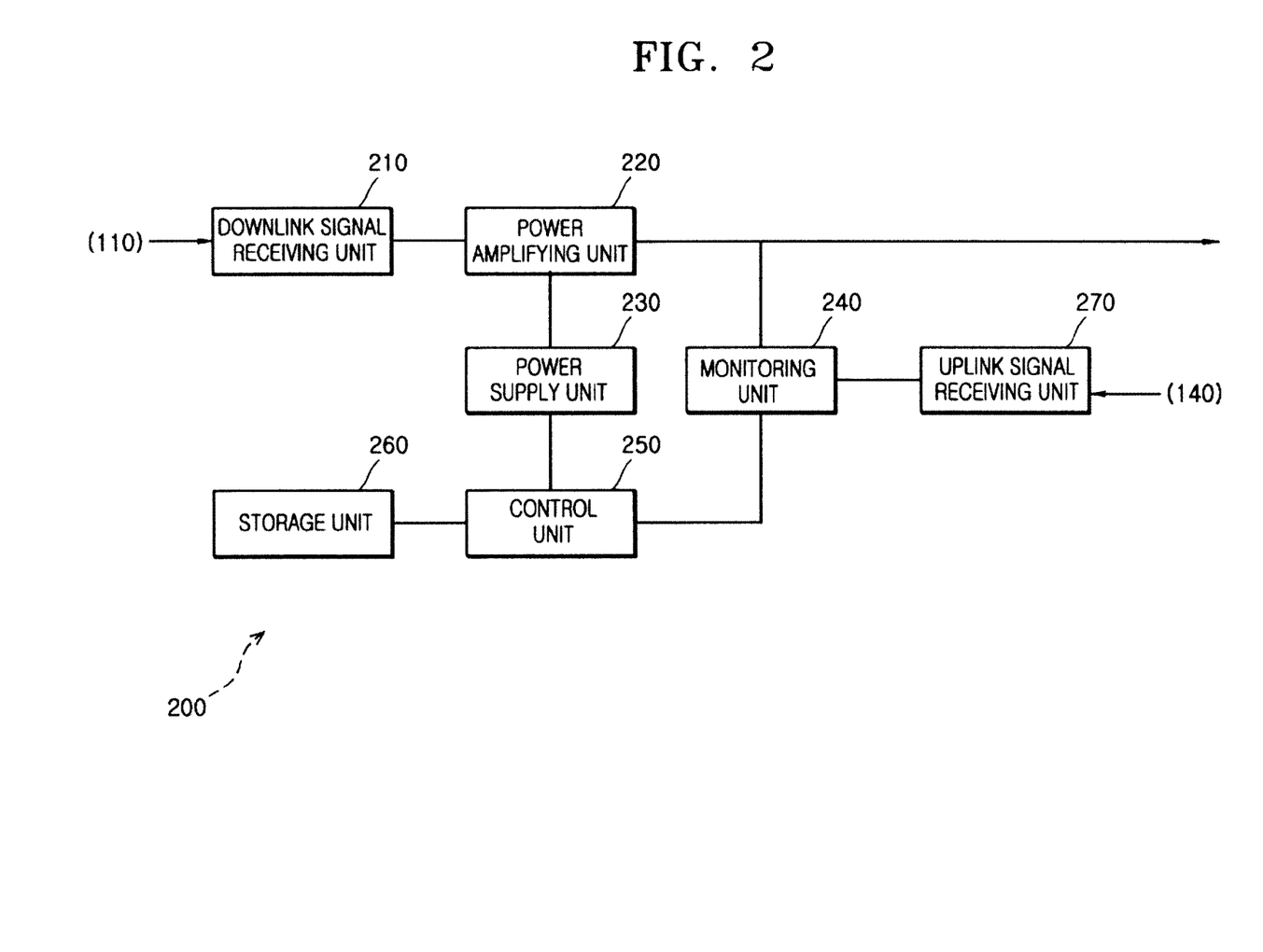
FIG. 2 is a block configuration diagram of a communication device according to an embodiment of the inventive concept.

FIG. 2 is a block configuration diagram of a communication device according to an embodiment of the inventive concept.

Referring to FIG. 2, the communication device 200 according to the embodiment of the inventive concept may include a downlink signal receiving unit 210, a power amplifying unit 220, a power supply unit 230, a monitoring unit 240, a control unit 250, a storage unit 260 and an uplink signal receiving unit 270. The communication device 200 according to the embodiment of the inventive concept has a concept including both the first communication device 120 and the second communication device 130. Thus, in the case of the second communication device 130 that is a node unit of DAS, the master unit 131-1 and/or the remote unit 133-$n$ may include the components described above. Therefore, hereinafter, the first communication device 120 and the second communication device 130 will be commonly referred to as the communication device 200 without distinction.

If a downlink signal transmitted from the base station 110 and/or another communication device (not shown) is input to the downlink signal receiving unit 210, the downlink signal receiving unit 210 may output the input downlink signal to the power amplifying unit 220. The downlink signal may include data, communication scheme and power information. The downlink signal may further include time information and the like. The downlink signal receiving unit 210 may include an antenna and the like.

The uplink signal receiving unit 270 may receive an uplink signal from another communication device (not shown) and/or the mobile communication terminal 140. The received uplink signal may be processed to be transmitted to the base station 110. The uplink signal may include data, communication scheme and power information. The uplink signal may further include time information and the like. The uplink signal receiving unit 270 may include an antenna and the like. Particularly, the received uplink signal may be output to the monitoring unit 240 to be used in determination of a current state, which will be described later.

The power amplifying unit 220 may amplify and output the downlink signal input from the downlink signal receiving unit 210 by using a supply voltage supplied from the power supply unit 230 (hereinafter, the signal amplified in the power amplifying unit 220 is referred to as an 'output signal'). That is, the power amplifying unit 220 may include one or more power amplifiers. The power amplifiers may amplify the downlink signal by using the supply voltage supplied from the power supply unit 230. For example, it is assumed that the power amplifier includes at least one power transistor that receives a supply voltage supplied through a drain terminal from the power supply unit 230. In this instance, the power transistor included in the power amplifier may amplify a downlink signal by using the supply voltage supplied from the power supply unit 230.

The monitoring unit 240 may monitor an output signal output from the power amplifying unit 220, and output a monitoring result to the control unit 250. As an example, the monitoring unit 240 may monitor an output signal, thereby generating output signal information on the output signal. The output signal information is information on the power of an output signal, and may be information corresponding to an average value and/or a root mean square (RMS) with respect to power of the output signal. As another example, the monitoring unit 240 may reproduce an output signal and output the reproduced output signal to the control unit 250. In this case, the control unit 250 may generate output signal information on the input output signal.

The monitoring unit 240 may monitor an uplink signal received to the uplink signal receiving unit 270, and output a monitoring result to the control unit 250. As an example, the monitoring unit 240 may monitor an uplink signal, thereby generating uplink signal information on the uplink signal. The uplink signal information is information on the power of an uplink signal, and may be information corresponding to an average value and/or an RMS with respect to power of the uplink signal. As another example, the monitoring unit 240 may reproduce an uplink signal and output the reproduced uplink signal to the control unit 250. In this case, the control unit 250 may generate uplink signal information on the input uplink signal.

The control unit 250 may determine a current state based on the output signal information and/or the uplink signal information. As an example, the control unit 250 may determine a current state by comparing predetermined downlink reference information with the output signal information. That is, if the output signal information is not less than the downlink reference information, the control unit 250 may determine that the current state is an active state. Here, the active state is a state in which communication traffic is high. This is because, if the output signal information is not less than the downlink reference information, the power of the output signal is high, which means that downlink communication traffic is high. On the contrary, if the output signal information is less than the downlink reference information, the control unit 250 may determine that the current state is an idle state. The idle state may be a state in which communication traffic is low or a communication standby state. This is because, if the output signal information is less than the downlink reference information, the power of the output signal is low, which means that the downlink communication traffic is low.

As another example, the control unit 250 may determine a current state by comparing predetermined uplink reference information with the uplink signal information. That is, if the uplink signal information is not less than the uplink reference information, the control unit 250 may determine that the current state is the active state. This is because, if the uplink signal information is not less than the uplink reference information, the power of the uplink signal is high, which means that uplink communication traffic is high. On the contrary, if the uplink signal information is less than the uplink reference information, the control unit 250 may determine that the current state is the idle state. This is because, if the uplink signal information is less than the uplink reference information, the power of the uplink signal is low, which means that the uplink communication is low.

As still another example, if it is determined that both the downlink communication traffic and the uplink communication traffic are low, the control unit 250 may determine that the current state is the idle state. If it is determined that at least one of the downlink communication traffic and the uplink communication traffic is high, the control unit 250 may determine that the current state is the active state. As still another example, if it is determined that any one of the downlink communication traffic and the uplink communication traffic is low, the control unit 250 may determine that the current state is the idle state. As described above, the control unit 250 may determine whether the current state is the active state or the idle state by using the output signal information and/or the uplink signal information.

Thus, the control unit 250 may control a voltage corresponding to the output signal information to be supplied to the power amplifying unit 220 when the current state is the active state. Hereinafter, an operation of the control unit 250 when the current state is the active state will be described with respect to a transistor characteristic curve of FIG. 3.

Figure 3:
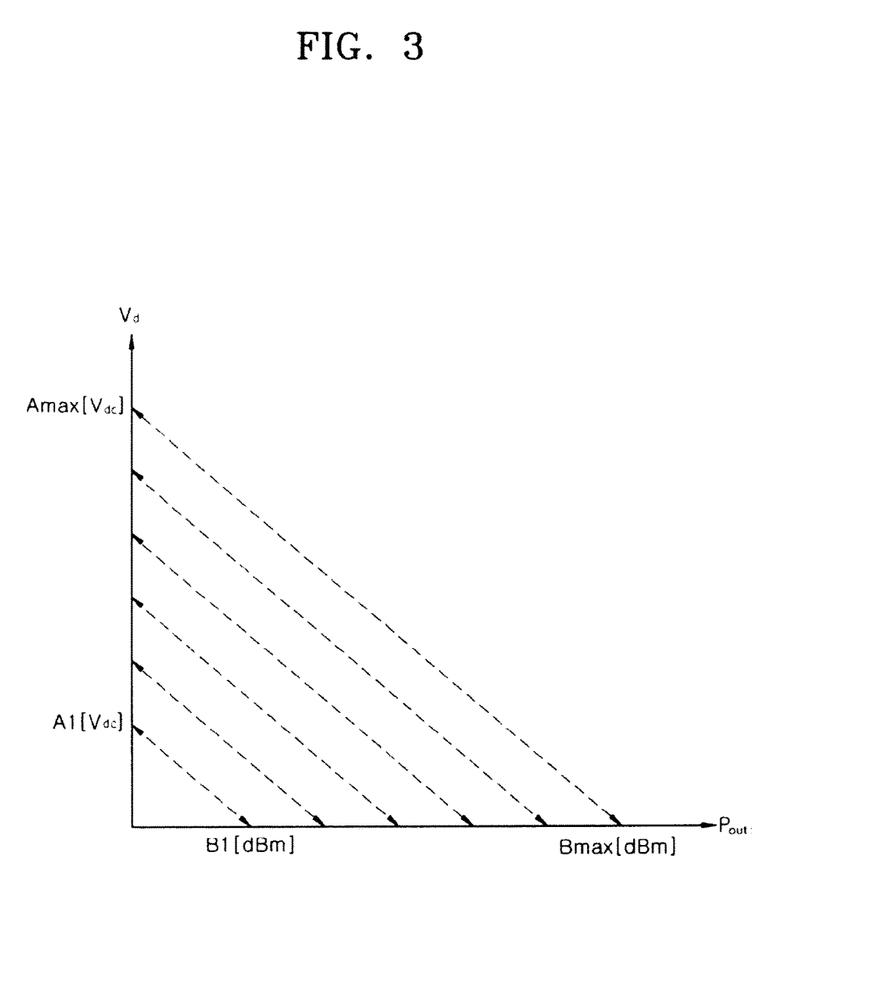
FIG. 3 is a graph of a transistor characteristic curve.

FIG. 3 is a graph of a transistor characteristic curve.

Referring to FIG. 3, there is exemplified a case where the output signal information becomes B [dBm] when A [Vdc] is supplied to the power amplifying unit 220. For example, there is exemplified a case where the output signal information becomes B1 [dBm] when A1 [Vdc] is supplied to the power amplifying unit 220, the output signal information becomes B2 [dBm] when A2 [Vdc] is supplied to the power amplifying unit 220, and the output signal information becomes Bmax [dBm] when Amax [Vdc] is supplied to the power amplifying unit 220. In this instance, the A1, A2, . . . , Amax are real numbers, and their magnitudes may have a relationship of A1< A2< . . . <Amax. Also, the B1, B2, . . . , Bmax are real numbers, and their magnitudes may have a relationship of B1< B2< . . . <Bmax. The Amax may be the maximum voltage at which the power amplifying unit 220 can maintain linearity. That is, as the voltage supplied to the power amplifying unit 220 increases (here, the supplied voltage is not more than Amax), the power of an output signal output from the power amplifying unit 220 linearly increases.

Meanwhile, conventionally, the voltage supplied to the power amplifying unit is set to the maximum voltage (e.g., the Amax) so that an output signal with sufficiently high power (peak) is transmitted against a case where the number of callers increases. This causes a problem in that excessive power is consumed when the number of callers decreases. This is because the power of the output signal corresponds to not only the magnitude of the voltage supplied to the power amplifying unit but also the power of an input signal (see FIG. 4). Accordingly, the communication device 200 according to the embodiment of the inventive concept enables power suitable for the current state to be consumed by monitoring the output signal. For example, the control unit 250 may read control information corresponding to the output signal information by using previously stored voltage control information, and control the voltage supplied to the power amplifying unit 220 by using the read control information. Here, the voltage control information is information on a voltage corresponding to the output signal information, and may be information previously stored in the storage unit 260.

The following Table 1 is a table illustrating control information. Referring to Table 1, when the output signal information corresponds to the 'B1,' the control unit 250 may read 'Ctrl-A1' as control information, and control the power supply unit 230 by using the read 'Ctrl-A1.' Accordingly, the power supply unit 230 can supply a voltage corresponding to the 'Ctrl-A1,' e.g., the A1 [Vdc] to the power amplifying unit 220. When the output signal information corresponds to the 'B2,' the control unit 250 may read 'Ctrl-A2' as control information, and control the power supply unit 230 by using the read 'Ctrl-A2.' Accordingly, the power supply unit 230 can supply a voltage corresponding to the 'Ctrl-A2,' e.g., the A2 [Vdc] to the power amplifying unit 220. When the output signal information corresponds to 'Bmax,' the control unit 250 may read 'Ctrl-Amax' as control information, and control the power supply unit 230 by using the read 'Ctrl-Amax.' Accordingly, the power supply unit 230 can supply a voltage corresponding to the 'Ctrl-Amax,' e.g., the Amax [Vdc] to the power amplifying unit 220. Here, the B1, B2, . . . , Bmax are real numbers, and their magnitudes may have a relationship of B1< B2< . . . <Bmax. The control unit 250 can control the power supply unit 230 by using the 'Ctrl-Amax' even when the output signal information exceeds the 'Bmax.' This is because the 'Ctrl-Amax' corresponds to the maximum voltage at which the power amplifying unit 220 can maintain linearity.

TABLE 1

| Output Signal Information | Control Information |
|---|---|
| B1 | Ctrl-A1 |
| B2 | Ctrl-A2 |
| . . . | . . . |
| Bmax | Ctrl-Amax |

Although it has been described in the above that the control unit 250 controls the voltage of the power supply unit 230 by using previously stored voltage control information in the form of a table, the control unit 250 may control the power supply unit 230 in another manner. For example, the voltage control information may be previously set to the form of a function. That is, when the voltage control information is previously set to the form of a linear function, the control unit 250 may control the voltage of the power supply unit 230 by using, as control information, a result value obtained by inputting output signal information as a variable to the voltage control information. Therefore, the scope of the inventive concept is not limited to the form of the voltage control information.

Referring back to FIG. 2, if it is determined that the current state is the idle state, the control unit 250 may control a first voltage to be supplied to the power amplifying unit 220. Here, the first voltage may be a voltage previously set as a voltage lower than the minimum voltage to be supplied to the power amplifying unit 220 when the current state is the active state. For example, the first voltage may be set lower than the voltage supplied to the power amplifying unit 220 according to 'Ctrl-A1' among the control information included in the voltage control information.

Meanwhile, if it is determined that the current state is the idle state, the control unit 250 may determine whether a current time corresponds to idle time information. Here, the idle time information is information on a time when the idle state repeatedly occurs, and may be information previously stored in the storage unit 260. For example, it is assumed that the communication device 200 is installed inside a subway tunnel. In the case of the subway, the subway is operated only for a fixed time period (e.g., from 05:00 AM to 11:30 PM) everyday. For a time period in which the subway is not operated, it is highly likely that the current state of the communication device 200 will be maintained as the idle state. Therefore, in a case where the current state is the idle state and the current time is an idle time, the control unit 250 may control a second voltage lower than the first voltage to be supplied to the power amplifying unit 220. Here, the first and second voltages are previously set voltages. The first voltage may be a voltage lower than the normal voltage, and the second voltage may be a voltage lower than the first voltage.

The power of the output signal is changed corresponding to not only the voltage supplied from the power supply unit 230 but also the input power of the downlink signal input through the downlink signal receiving unit 210. The change of the power of the output signal will be described referring to FIG. 3.

Figure 4:
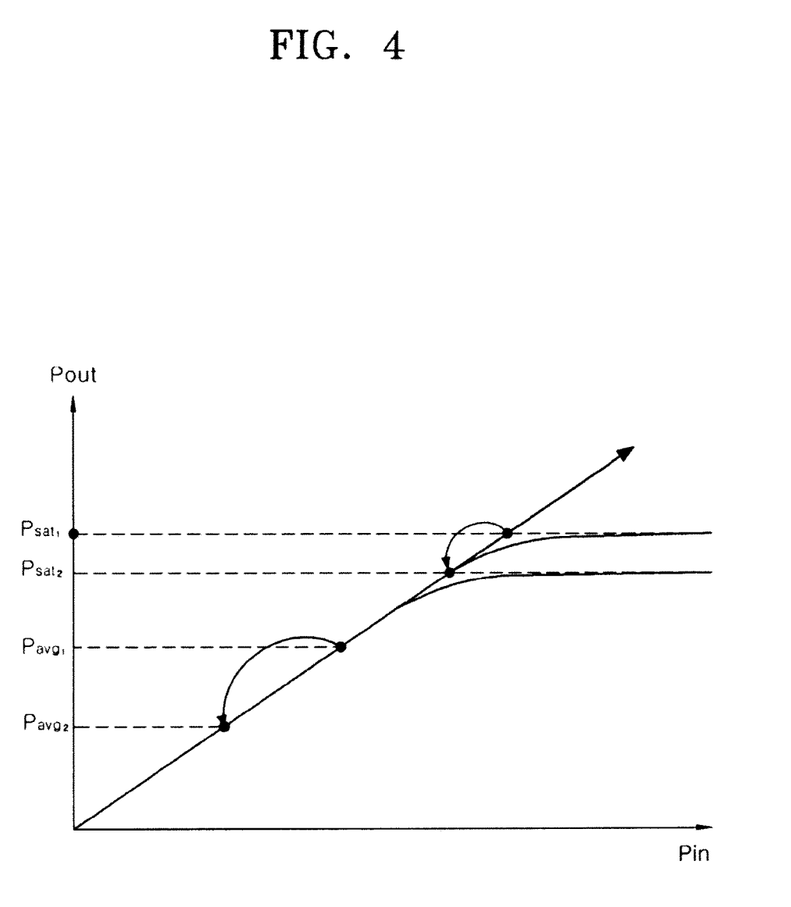
FIG. 4 is a graph illustrating outputs with respect to inputs of a power amplifying unit provided in the communication device according to the embodiment of the inventive concept.

FIG. 4 is a graph illustrating outputs with respect to inputs of the power amplifying unit provided in the communication device according to the embodiment of the inventive concept.

The magnitude of power of an output signal may be changed by power of a downlink signal input to the power amplifying unit 220 and a voltage supplied to the power amplifying unit 220 from the power supply unit 230. The gain of the output signal may be the same regardless of the power of the downlink signal and the voltage supplied from the power supply unit 230. As shown in FIG. 4, it can be seen that if the power of the input downlink signal is high due to an increase in communication traffic, the communication device 200 outputs an output signal with high power, and if the power of the input downlink signal is low due to a decrease in communication traffic, the communication device 200 outputs an output signal with low power. Also, it can be seen that in a case where the power of the downlink signal input to the power amplifying unit 220 is constant, the power of an available output signal decreases as the voltage supplied to the power amplifying unit 220 from the power supply unit 230 is lowered.

Pavg1 is a value corresponding to the output signal information in the active state. Pavg2 is a value corresponding to the output signal information in the idle state. As shown in FIG. 4, it can be seen that the value of the output signal information in the idle state decreases as compared that in the active state.

Psat1 is linear output power that the power amplifier within the power amplifying unit 220 can maximally use in the active state. Psat2 is linear output power that the power amplifier within the power amplifying unit 220 can maximally use in the idle state. As shown in FIG. 4, it can be seen that, since the first voltage (smaller than the normal voltage) is supplied to the power amplifier within the power amplifying unit 220 in the idle state, Psat1 is smaller than Psat2. That is, it can be seen that the power of an available output signal in the idle state decreases as compared with that in the active state (Psat1>Psat2).

Although the power of an available output signal decreases as the voltage supplied to the power amplifying unit 220 is controlled as the first voltage, the back-off amount of the power amplifying unit 220 is sufficiently secured. Hence, the performance of the communication device 200 is not deteriorated. This is because the output signal information in the idle state also decreases (as compared with that in the active state).

Although not shown in this figure, if the voltage supplied to the power amplifying unit 220 is controlled as the second voltage, the linear output power that the power amplifier within the power amplifying unit 220 can maximally use will become smaller than Psat2. In this case, the back-off amount of the power amplifying unit 220 may not be sufficiently secured, but it is hardly likely that the communication traffic will increase for the idle time. Thus, although the voltage supplied to the power amplifying unit 220 is controlled as the second voltage, it is hardly likely that the performance of the communication device 200 will be deteriorated.

The communication device 200 can control the voltage supplied to the power amplifying unit 220 according to the output signal information in the active state by the operation described above, and decrease the supply voltage supplied to the power amplifying unit 220 in the idle state and/or the idle time by the operation described above. The power consumed in the communication device 200 is in proportion to the power (voltage) supplied to the power amplifying unit 220. Thus, the power consumed in the communication device 200 can be reduced.

Referring back to FIG. 2, the control unit 250 may determine whether the idle state is maintained by monitoring the output signal and/or the uplink signal. As described above, the monitoring unit 240 may monitor the output signal and/or the uplink signal, and output the monitoring result to the control unit 250. If it is determined that the current state has returned to the active state as the monitoring result (i.e., if it is determined that the current state is released from the idle state), the control unit 250 may control the power supply unit 230 such that a voltage corresponding to the output signal is supplied to the power amplifying unit 220.

If the idle state is released, the control unit 250 may generate information (i.e., idle time information) on a time for which the idle state is maintained, and store the generated information in the storage unit 260. For example, the control unit 250 may recognize a time when the current state is switched from the active state to the idle state and a time when the current state is switched from the idle time to the active state, and generate idle time information on the recognized times, thereby storing the generated idle time information in the storage unit 260. That is, it is assumed that the current state has been switched from the active state to the idle state at 22:00 PM, and the current state has been again released from the idle state at 23:00 PM. Then, the control unit 250 may generate "22:00 PM to 23:00 PM" as idle time information, and store the generated idle time information in the storage unit 260.

In a case where the time when the current state is determined as the idle state is repeated preset m times or more, the control unit 250 may generate idle time information (here, the m is a natural number of 2 or more). For example, it is assumed that the m is previously set as 10. In a case where the idle time occurs at the same time for 10 days, the control unit 250 may generate information on the time as idle time information. This is because that the idle state is repeated at the same time for consecutive m days or more means that it is highly likely that the current state will become the idle state at the time.

Meanwhile, if it is determined that the current state is the active state even though the time is a time corresponding to the idle time information, the control unit 250 may delete the idle time information. This is because that communication traffic is high at a time corresponding to the idle time information means that the time is no longer the idle time.

In the above, the case where one power amplifier is included in the power amplifying unit 220 has been assumed and described. Hereinafter, a case where a plurality of power amplifiers are included in the power amplifying unit 220 will be described with reference to FIG. 5.

Figure 5:
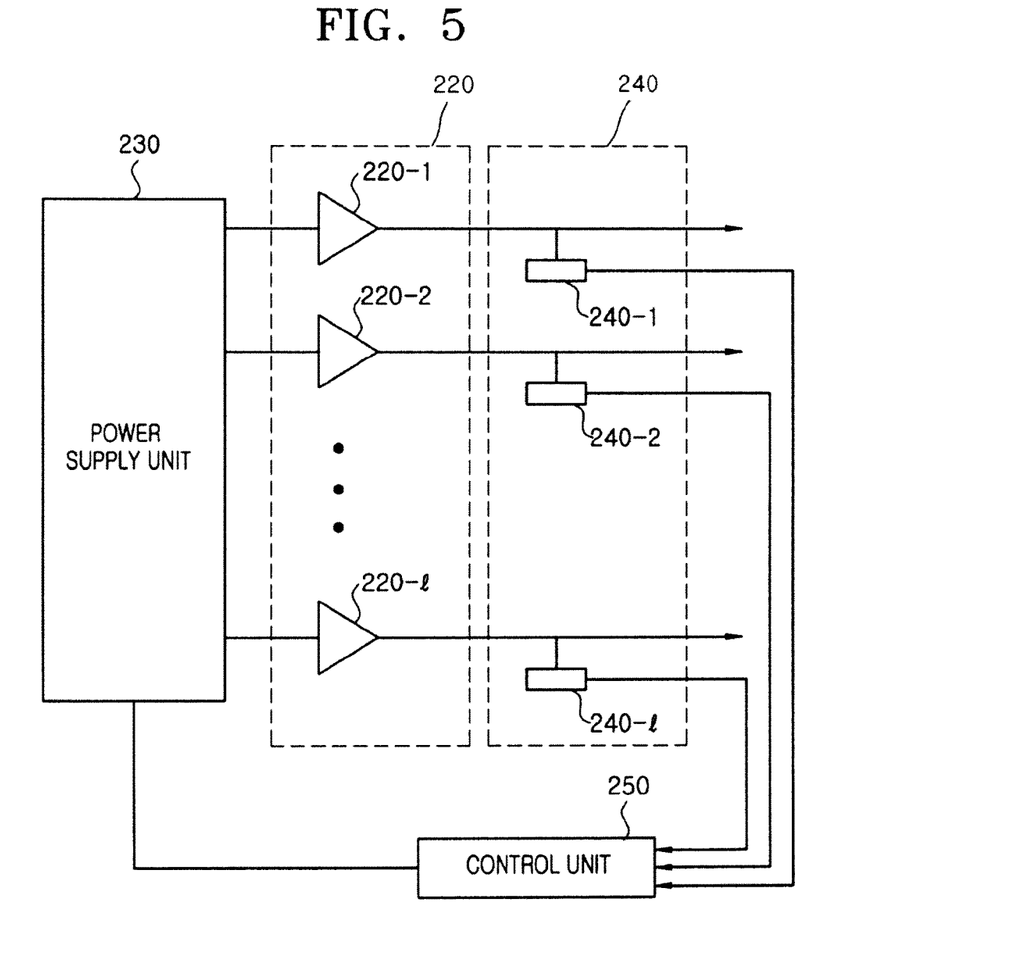
FIG. 5 is a block configuration diagram of a communication device according to another embodiment of the inventive concept.

FIG. 5 is a block configuration diagram of a communication device according to another embodiment of the inventive concept.

Referring to FIG. 5, a power amplifying unit 220 of the communication device 200 according to the embodiment of the inventive concept includes l power amplifiers 220-1, 220-2, . . . , 220-*l*, and a monitoring unit 240 of the communication device 200 includes l sub-monitoring units 240-1, 240-2, . . . , 240-*l* for monitoring output signals output from the respective power amplifiers. Meanwhile, in FIG. 5, it has been illustrated that, for convenience of illustration, the monitoring unit 240 includes sub-monitoring units corresponding to the number of power amplifiers. However, the inventive concept is not limited thereto, and the number of sub-monitoring units may be different from that of power amplifiers.

The plurality of power amplifiers 220-1, 220-2, . . . , 220-*l* may output signals of communication schemes corresponding to different services. For example, a first power amplifier 220-1 may amplify a downlink signal of a CDMA, a second power amplifier 220-2 may amplify a downlink signal of a W-CDMA scheme, and l-th power amplifier 220-*l* may amplify a downlink signal of an LTE scheme. Here, each of the power amplifiers 220-1, 220-2, . . . , 220-*l* may includes at least one power transistor (not shown) receiving a supply voltage supplied from the power supply unit 230 through a drain terminal thereof.

The sub-monitoring units 240-1, 240-2, . . . , 240-*l* may monitor output signals output from the corresponding power amplifiers 220-1, 220-2, . . . , 220-*l*, respectively, and output monitoring results to the control unit 250. The control unit 250 may determine current states of the plurality of power amplifiers 220-1, 220-2, . . . , 220-*l* based on the results monitored by the plurality of sub-monitoring units 240-1, 240-2, . . . , 240-*l*, and control power corresponding to the current state to be supplied to each of the power amplifiers 220-1, 220-2, . . . , 220-*l*. Specifically, the control unit 250 may control the power supply unit 230 such that the supply voltage supplied to the drain terminal of the power transistor of each of the plurality of power amplifiers 220-1, 220-2, . . . , 220-*l* corresponds to the current state. Here, downlink reference information for determining idle states of the plurality of power amplifiers 220-1, 220-2, . . . , 220-*l* may be set different from one another.

Although not shown in this figure, the sub-monitoring units 240-1, 240-2, . . . , 240-*l* may monitor corresponding uplink signals, respectively, and output monitoring results to the control unit 250. The control unit 250 may determine current states of the plurality of power amplifiers 220-1, 220-2, . . . , 220-*l* based on the results monitored by the plurality of sub-monitoring units 240-1, 240-2, . . . , 240-*l*, and control power corresponding to the current state to be supplied to each of the power amplifiers 220-1, 220-2, . . . , 220-*l*. In this case, uplink reference information for determining idle states of the power amplifiers 220-1, 220-2, . . . , 220-*l* may be set different from one another.

For example, it is assumed that a first sub-monitoring unit 240-1 monitors an output signal and an uplink signal of the CDMA scheme, and a second sub-monitoring unit 240-2 monitors an output signal and an uplink signal of the W-CDMA scheme. In this instance, the first sub-monitoring unit 240-1 may monitor an output signal and an uplink signal of the CDMA scheme and output the output signal and the uplink signal to the control unit 250. The second sub-monitoring unit 240-2 may monitor an output signal and an uplink signal of the W-CDMA scheme and output the output signal and the uplink signal to the control unit 250. The control unit 250 may analyze information received from each of the sub-monitoring units 240-1 and 240-2. As an analysis result, if the information received from the first sub-monitoring unit 240-1 is in the idle state, the control unit 250 may control a supply voltage supplied to the first power amplifier 220-1 to become a first voltage (or second voltage). On the other hand, if the information received from the second sub-monitoring unit 240-2 is in the active state, the control unit 250 may control a supply voltage supplied to the second power amplifier 220-2 to become a normal voltage.

As described above, the communication device 200 according to the embodiment of the inventive concept can control power for amplifying a signal according to communication traffic, thereby preventing consumption of unnecessary power.

Figure 6:
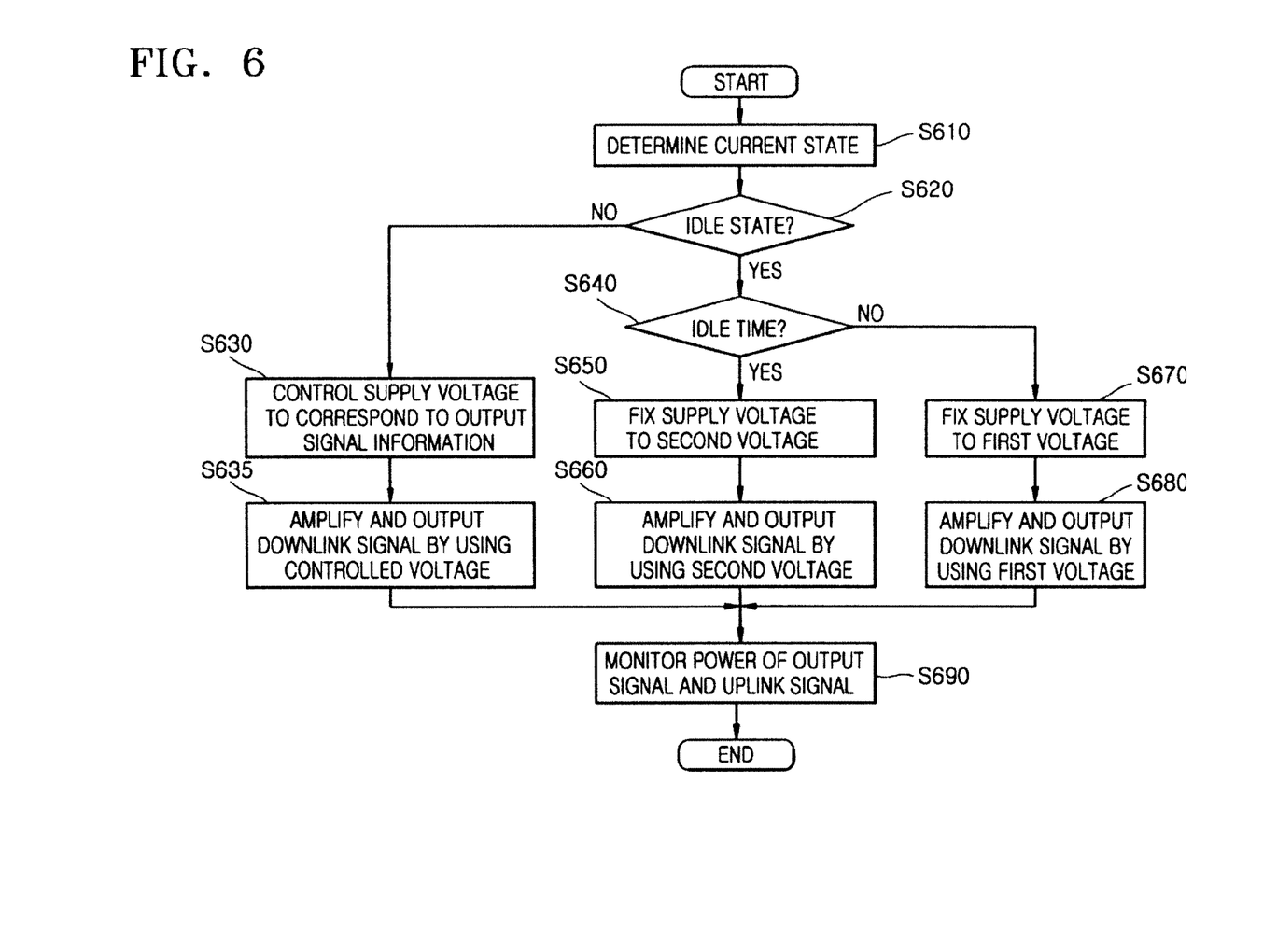
FIG. 6 is a flowchart illustrating a method for controlling power of a communication device according to an embodiment of the inventive concept.

FIG. 6 is a flowchart illustrating a method for controlling power of a communication device according to an embodiment of the inventive concept.

Hereinafter, a method for controlling power of a communication device according to an embodiment of the inventive concept will be described with reference to FIG. 6. The following steps may be steps performed by the components included in the communication device 200 described with reference to FIG. 2, but will be commonly referred to as steps performed in the communication device 200 for convenience of understanding and explanation. Therefore, a subject performing each of the following steps may be omitted.

In step S610, the communication device 200 determines a current state according to a predetermined method. The communication device 200 may amplify a downlink signal received from the base station 110 and/or another communication device (not shown) by using a predetermined supply voltage. The communication device 200 may determine the current state by comparing predetermined downlink reference information with output signal information on an output signal. If the output signal information is not less than the downlink reference information, the communication device 200 may determine that the current state is an active state. On the contrary, if the output signal information is less than the downlink reference information, the communication device 200 may determine that the current state is an idle state.

The communication device 200 may determine the current state by comparing predetermined uplink reference information with uplink signal information on an uplink signal. If the uplink signal information is not less than the uplink reference information, the communication device 200 may determine that the current state is the active state. On the contrary, if the uplink signal information is less than the uplink reference information, the communication device 200 may determine that the current state is the idle state. The communication device 200 may determine that the current state is the idle state only when the output signal information is less than the downlink reference information, and the uplink signal information is less than the uplink reference information.

In step S620, if it is determined that the current state is the active state, the communication device 200 may control the supply voltage supplied to a power amplifier to correspond to the output signal information in order to amplify the downlink signal (step S630). For example, the communication device 200 may read control information corresponding to the output signal information by using previously stored voltage control information, and control the supply voltage supplied to the power amplifier by using the read control information. Here, the voltage control information is information on a voltage corresponding to the output signal information, and may be information previously stored in a storage space of the communication device 200. The operation in which the communication device 200 controls the voltage by using the voltage control information is similar to that described with reference to FIGS. 2 and 3, and therefore, its description will be omitted to avoid redundancy.

In step S635, the communication device 200 amplifies and outputs the downlink signal by using the voltage controlled to correspond to the output signal.

On the other hand, if it is determined that the current state is the idle state as a determination result in step S620, i.e., if the output signal information is less than the downlink reference information, the communication device 200 determines whether a current time corresponds to idle time information (step S640). The idle time information is information on a time when the idle state repeatedly occurs, and may be information previously stored in a data storage space provided in the communication device 200.

In step S650, in a case where the current state is the idle state and the current time is an idle time, the communication device 200 may control the supply voltage supplied to the power amplifier to be fixed to a second voltage. That is, in the case where the current state is the idle state and the current time is the idle time, the communication device 200 may control the supply voltage supplied to a power amplifier to correspond to the second voltage in order to amplify the downlink signal.

In step S660, the communication device 200 amplifies and outputs the downlink signal by using the second voltage.

In a case where the current state is the idle state and the current time is not the idle time as a determination result in step S640, the communication device 200 may control the supply voltage supplied to the power amplifier to be fixed to a first voltage (step S670). That is, in the case where the current state is the idle state and the current time is not the idle time, the communication device 200 may control the supply voltage supplied to the power amplifier to correspond to the first voltage in order to amplify the downlink signal.

In step S680, the communication device 200 amplifies and outputs the downlink signal by using the first voltage.

In step S690, the communication device 200 monitors the power of the amplified output signal and/or the uplink signal. If it is determined that the current state has been released from the idle state by monitoring the power of the amplified output signal and/or the uplink signal, the communication device 200 amplifies the downlink signal by using a supply voltage corresponding to the output signal. That is, in a case where the current state becomes the active state as it is released from the idle state, the communication device 200 may control the supply voltage supplied to the power amplifier to correspond to the output signal in order to amplify the downlink signal.

Although not shown in this figure, the following steps may be further included in step S690. That is, the communication device 200 may perform a step of, if the idle state is released, generating information (i.e., idle time information) on a time for which the idle state is maintained and storing the generated information in a storage space provided in the communication device 200. For example, the communication device 200 may recognize a time when the current state is switched from the active state to the idle state and a time when the current state is switched from the idle time to the active state, and generate idle time information on the recognized times, thereby storing the generated idle time information in the storage space.

Also, the communication device 200 may perform a step of, in a case where the time when the current state is determined as the idle state is repeated predetermined m times or more, generating idle time information. For example, it is assumed that the m is previously set as 10. In a case where the idle time occurs at the same time for 10 days, the communication device 200 may generate information on the time as idle time information. This is because that the idle state is repeated at the same time for consecutive m days or more means that it is highly likely that the current state will become the idle state at the time.

Also, the communication device 200 may perform a step of, if it is determined that the current state is the active state even though the time is a time corresponding to the idle time information, deleting the idle time information. This is because that communication traffic is high at a time corresponding to the idle time information means that the time is no longer the idle time.

As described above, in the method according to the embodiment of the inventive concept, power for amplifying a signal can be controlled according to communication traffic, thereby preventing consumption of unnecessary power.

The method according to the inventive concept may be implemented as computer-readable codes on a computer-readable recording medium. The computer readable recording medium includes all kinds of recording media in which data that can be read by a computer system is stored. Examples of the computer readable recording media may be a read only memory (ROM), a random access memory (RAM), a magnetic tape, a magnetic disk, a flash memory, an optical date storage device, and the like. Also, the computer-readable recording medium may be distributed over computer systems connected to a computer communication network, and computer-readable codes distributively stored and executed therein.

While the inventive concept has been described with respect to the specific embodiments, it will be apparent to those skilled in the art that various changes and modifications may be made without departing from the spirit and scope of the invention as defined in the following claims.

What is claimed is:

1. A communication device, comprising:
a power amplifier configured to generate an output signal obtained by amplifying a downlink signal, using a supply voltage, and output the output signal; and
a processor configured to:
determine a current state by comparing predetermined downlink reference information stored in a storage with output signal information indicating power of the output signal,
if the current state is an active state as a comparison result, control the supply voltage to correspond to the output signal information,
if the current state is an idle state and a current time does not correspond to predetermined first idle time information, control the supply voltage to correspond to a first voltage, generate second idle time information indicating a time when the current state is determined to be the idle state, and store the second idle time information to the storage unit, and
if the current state is the idle state and the current time corresponds to the first idle time information, control the supply voltage to correspond to a second voltage which is a voltage lower than the first voltage,
wherein, if the time when the current state is determined as the idle state is repeated m times, the processor generates the second idle time information, wherein the m is a natural number of 2 or more,
wherein communication traffic of the active state is higher than communication traffic of the idle state, and
wherein the first idle time information and the second idle time information indicate when the idle state repeatedly occurs.

2. The communication device of claim 1,
wherein the processor reads control information corresponding to the output signal information from the storage in the active state, and controls the supply voltage by using the control information.

3. The communication device of claim 1, wherein, if it is determined that the current state has been released from the idle state, the processor controls the supply voltage to correspond to the output signal information.

4. The communication device of claim 1, wherein, if the idle state is released at a time corresponding to the first idle time information, the processor deletes the first idle time information.

5. The communication device of claim 1, wherein the output signal information corresponds to any one of an average value and a root mean square with respect to power of the output signal.

6. The communication device of claim 1, wherein the power amplifier comprises a plurality of power amplifiers configured to perform different communication services, and the processor controls the supply voltage input to each of the plurality of power amplifiers.

7. The communication device of claim 1, wherein the processor determines the current state by comparing predetermined uplink reference information with uplink signal information on an uplink signal and comparing the downlink reference information with the output signal information.

8. A method for controlling power of a communication device, the method comprising:

comparing predetermined downlink reference information with output signal information indicating power of an output signal obtained by amplifying a downlink signal using a supply voltage;

determining a current state of the communication device based on a comparison result;

if it is determined that the current state is an active state, controlling the supply voltage to correspond to the output signal information;

if it is determined that the current state is an idle state, determining whether a current time corresponds to predetermined first idle time information;

if the current time does not correspond to the first idle time information, controlling the supply voltage to correspond to a first voltage, generating second idle time information indicating a time when the current state is determined to be the idle state, and storing the second idle time information; and if the current time corresponds to the first idle time information, controlling the supply voltage to correspond to a second voltage which is a voltage lower than the first voltage, wherein, if the time when the current state is determined as the idle state is repeated m times, the processor generates the second idle time information, wherein the m is a natural number of 2 or more, wherein communication traffic of the active state is higher than communication traffic of the idle state, and wherein the first idle time information and the second idle time information indicate when the idle state repeatedly occurs.

9. The method of claim 8, wherein the controlling of the supply voltage comprises:

reading control information corresponding to the output signal information by using predetermined voltage control information in the active state; and controlling the supply voltage by using the control information.

10. The method of claim 8, further comprising, if it is determined that the current state has been released from the idle state, controlling the supply voltage to correspond to the output signal information.

11. The method of claim 8, further comprising, if the idle state is released at a time corresponding to the first idle time information, deleting the first idle time information.

* * * * *